US009043464B1

(12) United States Patent
Trainor et al.

(10) Patent No.: US 9,043,464 B1
(45) Date of Patent: May 26, 2015

(54) AUTOMATICALLY GROUPING RESOURCES ACCESSED BY A USER

(71) Applicant: Google Inc., Mountain View, CA (US)

(72) Inventors: David Trainor, Sunnyvale, CA (US); Theodore Nicholas Choc, Palo Alto, CA (US); Alex Neely Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 13/658,725

(22) Filed: Oct. 23, 2012

(51) Int. Cl.
*G06F 15/173* (2006.01)
*G06F 15/177* (2006.01)
*H04W 48/18* (2009.01)
*H04W 88/06* (2009.01)
*G06F 17/30* (2006.01)

(52) U.S. Cl.
CPC .............. *H04W 48/18* (2013.01); *H04W 88/06* (2013.01); *G06F 17/3053* (2013.01)

(58) Field of Classification Search
CPC H04W 48/18; H04W 88/06; G06F 17/30067; G06F 17/3053

USPC .................................................. 709/221, 225
See application file for complete search history.

(56) References Cited

U.S. PATENT DOCUMENTS

| 7,886,047 | B1* | 2/2011 | Potluri ........................... 709/224 |
| 2005/0234940 | A1* | 10/2005 | Apparao et al. .............. 707/100 |
| 2007/0239734 | A1* | 10/2007 | Arellanes et al. ............... 707/10 |
| 2008/0134042 | A1* | 6/2008 | Jankovich ...................... 715/733 |
| 2012/0166961 | A1* | 6/2012 | Frazier .......................... 715/738 |
| 2013/0111318 | A1* | 5/2013 | Fujino et al. .................. 715/205 |

* cited by examiner

*Primary Examiner* — Ebrahim Golabbakhsh
(74) *Attorney, Agent, or Firm* — McDermott Will & Emery LLP

(57) ABSTRACT

The disclosed subject matter relates to computer-implemented methods for automatically grouping resources, such as electronic files, websites, applications, and the like, that are accessed by a user. In one aspect, the disclosed subject matter relates to automatically displaying frequently accessed websites in website groups. One approach to defining the groups is to consider websites that are accessed within a certain amount of time to belong to a particular group. Website group graphics can be generated which point to the various groups of websites. The website group graphic for a grouping of websites can be used to access the websites that are a part of that grouping.

19 Claims, 9 Drawing Sheets

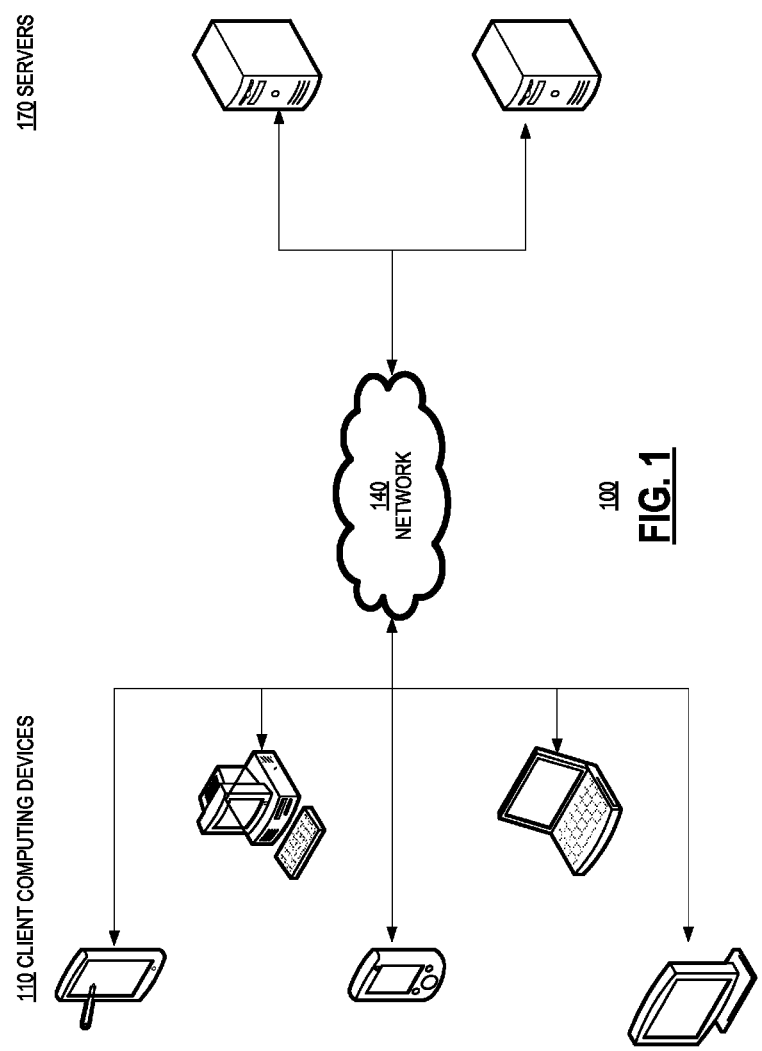

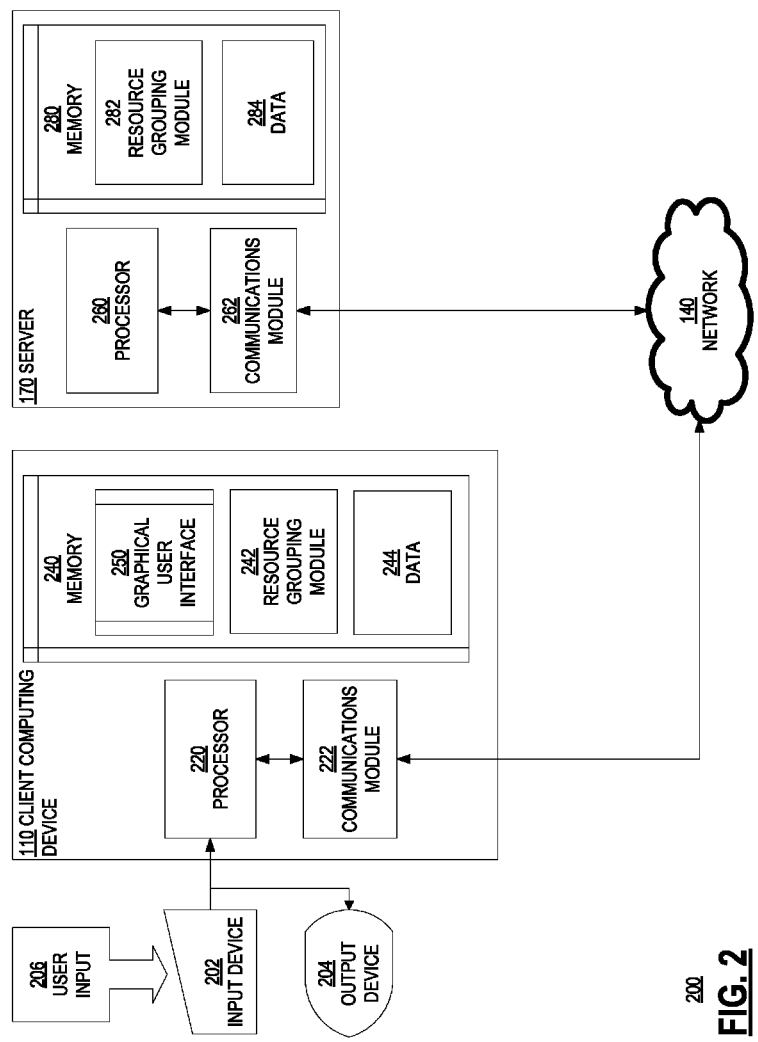

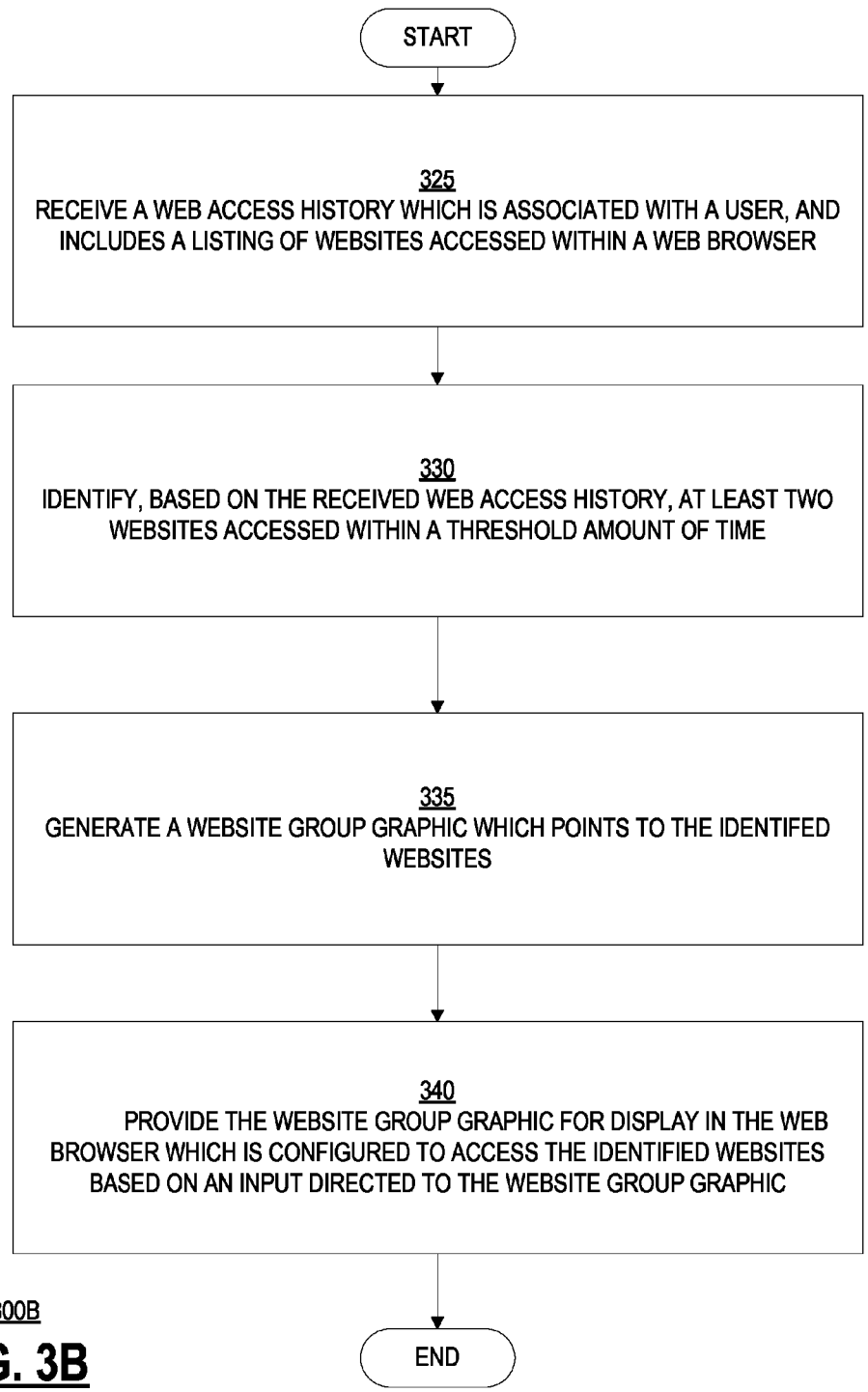

400A

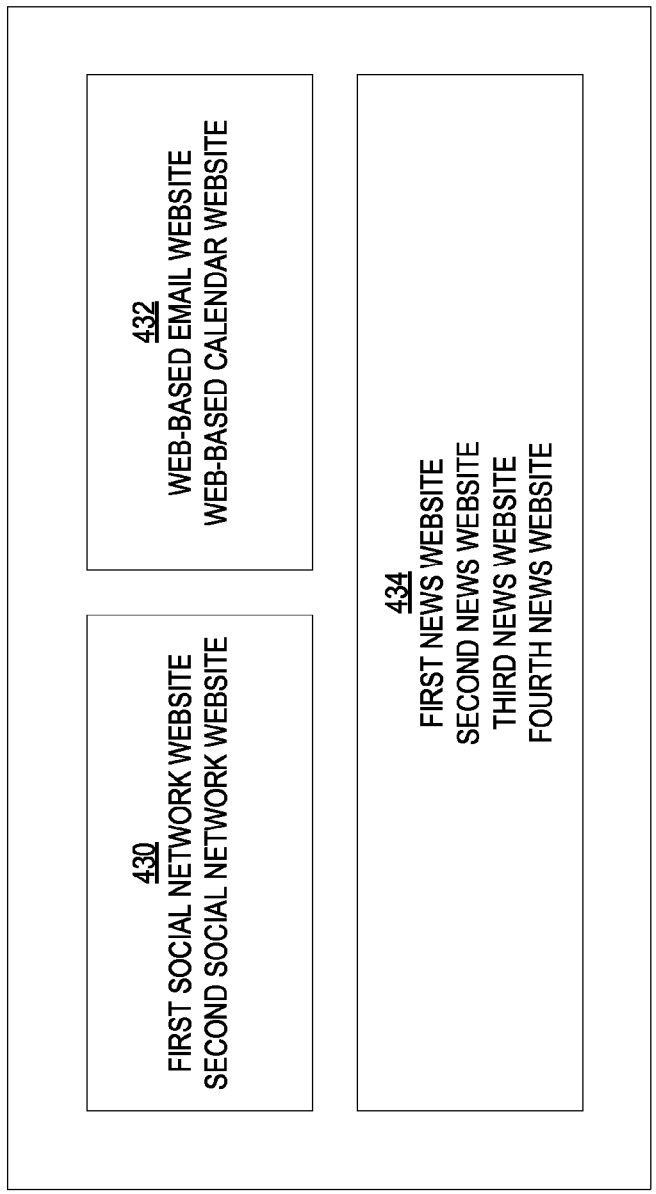

400C

AUTOMATICALLY GROUPING RESOURCES ACCESSED BY A USER

BACKGROUND

Users may access several resources such as documents, applications, and websites. For example, a user may start his email application to check his email, and a word processing application to draft a document.

SUMMARY

The disclosed subject matter relates to a computer-implemented method for automatically associating resources with a group identifier. The method includes receiving a resource access history associated with a user. The resource access history includes a listing of two or more resources accessed within a graphical user interface. The method further includes identifying, based on the received resource access history, at least two of the resources which are related based on an access relationship. The access relationship is based on an access-related aspect of the received access resource history corresponding to each of the identified resources. The method further includes generating a group identifier associated with the graphical user interface or the user. The method further includes associating, based on the access relationship, the group identifier with each of the identified resources.

The disclosed subject matter further relates to a system for automatically grouping websites for user access. The system includes a memory which includes instructions for automatically grouping websites for user access, and a processor. The processor is configured to execute the instructions to receive a web access history associated with a user. The web access history includes a listing of websites accessed within a web browser. The processor is further configured to identify, based on the received web access history, at least two websites which are accessed within a threshold amount of time. The processor is further configured to generate a website group graphic, which points to each of the identified websites. The processor is further configured to provide the website group graphic for display in the web browser. The web browser is configured to access each of the identified websites, based on an input directed to the website group graphic.

The disclosed subject matter further relates to a machine-readable storage medium including machine-readable instructions for causing a processor to execute a method for automatically displaying frequently accessed websites in website groups. The method includes receiving a web access history associated with a user. The web access history includes a listing of websites accessed within a web browser. The method further includes identifying, based on the received web access history, at least two websites which are accessed within a threshold amount of time, and at an access frequency. The method further includes generating a website group graphic, which points to each of the identified websites. The method further includes providing the website group graphic for display in the web browser. The web browser is configured to display the website group graphic at a display position commensurate with the access frequency of the identified websites. The web browser is further configured to access each of the identified websites based on an input directed to the website group graphic.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DESCRIPTION OF DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

FIG. 1 illustrates an example of an architecture for automatically grouping resources accessed by a user.

FIG. 2 is a block diagram illustrating an example of a client computing device and a server from the architecture of FIG. 1.

FIGS. 3A-C illustrate examples of processes for automatically grouping resources accessed by a user.

FIGS. 4A-C display examples of configurations in which website group graphics can be arranged for display in a web browser based on the examples of processes illustrated in FIGS. 3A-C.

DETAILED DESCRIPTION

Figure 3A:
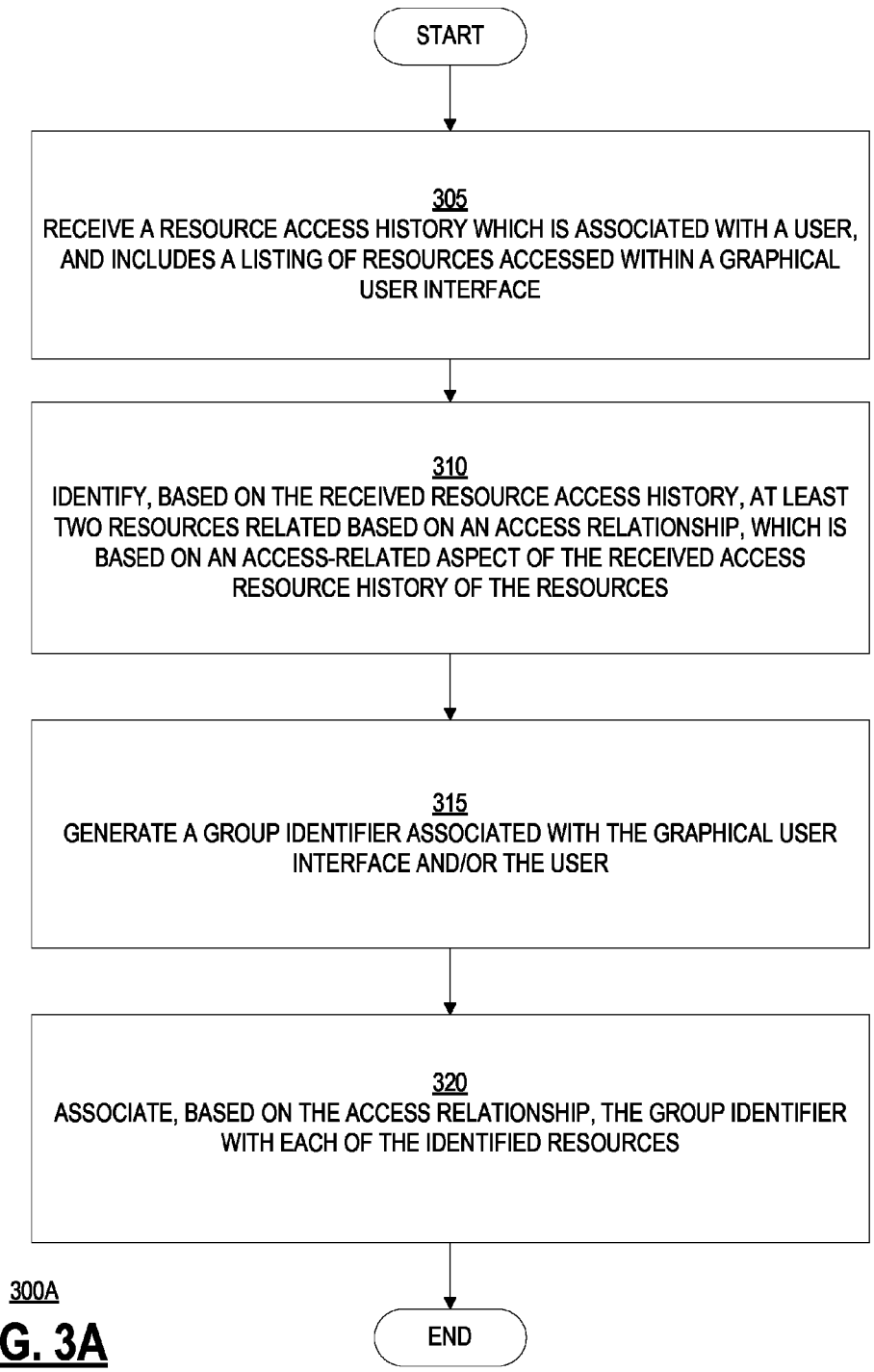

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, well-known structures and components are shown in block diagram form in order to avoid obscuring the concepts of the subject technology.

A user may routinely access several resources within a certain amount of time. That is, the user may access resources in groups. For example, the user may routinely launch two or more applications on an operating system at the beginning of a workday. As another example, the user may routinely open two or more electronic files when working on a particular project.

Operating systems and applications typically offer shortcuts to the most recently accessed resources, or the most frequently accessed resources. For example, an operating system may display at a prominent location in a menu, shortcuts to applications that are most recently and/or most frequently accessed. Similarly, an application may provide a listing of shortcuts to the most recently and/or most frequently accessed electronic files.

However, even with such shortcuts, the user typically has to access each particular resource individually. And, with each particular instance of the resource being accessed, the display position of the shortcut to the resource can be altered.

The subject disclosure describes systems and techniques for automatically grouping resources accessed by a user.

FIG. 1 illustrates an example of an architecture 100 for automatically grouping resources accessed by a user. The architecture 100 includes client computing devices 110 and servers 170 connected over a network 140.

The client computing devices 110 can be, for example, mobile computers, tablet computers, mobile devices (e.g., a smartphone or PDA), desktop computers, set top boxes (e.g., for a television), video game consoles, or any other devices having processing capabilities, communications capabilities, and memory.

The network 140 can include any one or more of the Internet, a personal area network (PAN), a local area network (LAN), a campus area network (CAN), a metropolitan area network (MAN), a wide area network (WAN), a broadband network (BBN), and the like. Further, the network 140 can include, but is not limited to, any one or more of the following network topologies, including a bus network, a star network, a ring network, a mesh network, a star-bus network, tree or hierarchical network, and the like.

Inputs e.g., pointer operations, keystrokes or touch-based gestures received from an input device can be processed locally on the client computing device 110 to which the input device is attached. Alternatively, the data generated by the input device can be provided to, and processed by one of the many servers 170. For purposes of load balancing, data and software instructions may be stored and/or processed on multiple servers 170.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

FIG. 2 is a block diagram 200 illustrating an example of a client computing device 110 and a server 170 in the architecture 100 of FIG. 1 according to certain aspects of the disclosure.

The client computing device 110 includes an input device 202, an output device 204, a processor 220, a communications module 222, and memory 240. The input device 202 can be a touchscreen, a mouse, a keyboard, an audio input device (e.g., a microphone), a video input device (e.g., a camera, a motion detector), or any other device to enable a user to supply input 206 to the client computing device 110. The output device 204 can be a display screen. Input 206 received via the input device 202 can be processed locally on the client computing device 110 and/or the server 170.

The client computing device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes a graphical user interface 250 which can be used by a user to interact with the client computing device 110 (e.g., to access various resources), the server 170, and can be used to display information to the user. The graphical user interface 250 may be installed locally at the client computing device 110 and/or downloaded from the server 170.

The memory 240 further includes software instructions that can be read by the processor 220 to execute a resource grouping module 242. The resource grouping module 242 can be a part of an operating system or an application e.g., a web browser. Data generated or stored by the resource grouping module 242 on the client computing device 110 can be stored as data 244.

In one implementation, the resource grouping module 242 includes instructions for automatically associating resources with a group identifier. Upon reading the software instructions of the resource grouping module 242, the processor 220 is configured to receive a resource access history associated with a user. The resource access history includes a listing of two or more resources accessed within a graphical user interface 250. The processor 220 is further configured to identify, based on the received resource access history, at least two of the resources which are related based on an access relationship. The access relationship is based on an access-related aspect of the received access resource history corresponding to each of the identified resources. The processor 220 is further configured to generate a group identifier associated with the graphical user interface 250 or the user. The processor 220 is further configured to associate, based on the access relationship, the group identifier with each of the identified resources.

In another implementation, the graphical user interface 250 can correspond to a web browser which includes the resource grouping module 242 for grouping websites for user access. Upon reading the software instructions of the resource grouping module 242, the processor 220 is configured to receive a web access history associated with a user. The web access history includes a listing of websites accessed within the web browser 250. The processor 220 is further configured to identify, based on the received web access history, at least two websites which are accessed within a threshold amount of time. The processor 220 is further configured to generate a website group graphic, which points to each of the identified websites. The processor 220 is further configured to provide the website group graphic for display in the web browser 250. The web browser 250 is configured to access each of the identified websites, based on an input directed to the website group graphic.

In yet another implementation, the resource grouping module 242 of the web browser 250 can automatically display frequently accessed websites in website groups. Upon reading the software instructions of the resource grouping module 242, the processor 220 is configured to receive a web access history associated with a user. The web access history includes a listing of websites accessed within the web browser 250. The processor 220 is further configured to identify, based on the received web access history, at least two websites which are accessed within a threshold amount of time, and at an access frequency. The processor 220 is further configured to generate a website group graphic, which points to each of the identified websites. The website group graphic is provided in the web browser 250. The web browser 250 is configured to display the website group graphic at a display position commensurate with the access frequency of the identified websites. The web browser 250 is further configured to access each of the identified websites based on an input directed to the website group graphic.

The server 170 includes a memory 280, a processor 260, and a communications module 262. The memory 280 includes software instructions that can be read by the processor 260 to implement a resource grouping module 282. The resource grouping module 282 can include instructions that can be read by the processor 260 to execute the operations described above instead of, or in conjunction with, the resource grouping module 242 on the client computing device 110.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

Figure 3C:
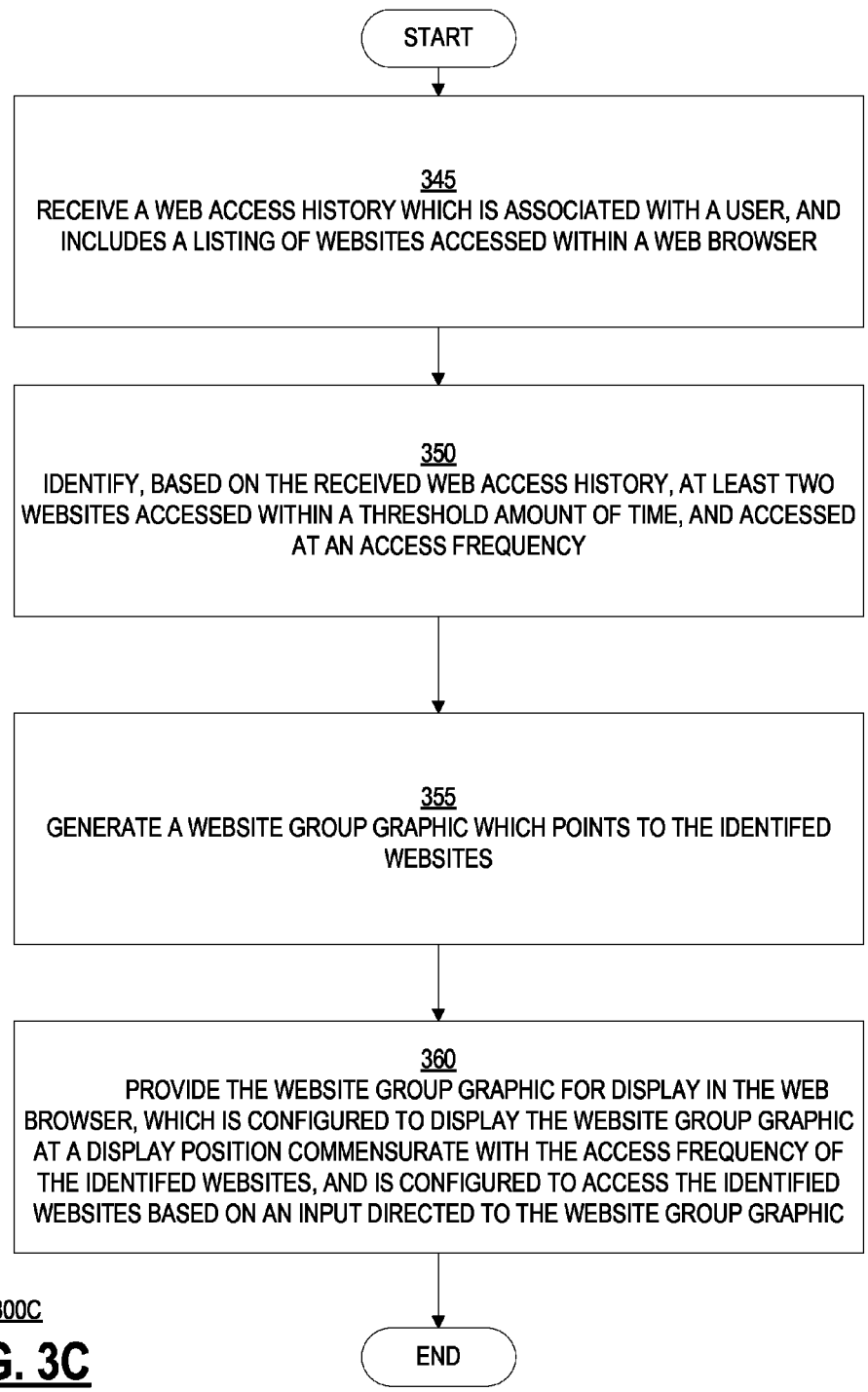

FIGS. 3A-C illustrate examples of processes 300A-C for automatically grouping resources accessed by a user. It should be noted that although processes 300A-C are described herein with reference to a client computing device 110, the processes 300A-C are not limited to such, and can be performed by other configurations. For example, processes 300A-C can be performed on the server 170 instead of, or in conjunction with the client computing device 110.

FIG. 3A illustrates an example of a process 300A for automatically associating resources with a group identifier.

In Step 305 a resource access history associated with a user is received e.g., by the resource grouping module 242. In one implementation, the resource access history can be received by the resource grouping module 282. The resource access history includes a listing of two or more resources accessed within a graphical user interface 250.

The resource access history can be defined in the context of the resource being accessed. For example, for a resource which is a website, the resource access history can be the Internet history which includes records of the website being accessed. Similarly, for a resource which is an application, the resource access history can include computer events which includes records of the application being accessed. And, for a resource which is data (e.g., a document, a spreadsheet), the resource access history can include application events which include records of the data being accessed.

In Step 310, at least two resources are identified which have an access relationship based on an access-related aspect. The access-related aspect of the identified resources can be that they are accessed within a threshold amount of time. For example, when a first resource is accessed, and within a threshold amount of time, a second resource is accessed, the two first resource and the second resources can have an access relationship that has an access-related aspect which is temporal.

The threshold amount of time can be configured based on a user-selectable value. For example, a user can select a value for the threshold amount of time. The threshold amount of time can also be set by default, or by the client computing device 110 or the server 170.

The access-related aspect of the access relationship between the identified resources can be based on an accessing of a resource (e.g., a second resource) based on an input directed to another resource (e.g., a first resource). For example, starting (e.g., spawning, launching, instantiating) a second window based on an input directed to a first window (e.g., parent window) of the graphical user interface 250, can form the basis for an access-related aspect of the access relationship between the first window and the second window.

In Step 315, a group identifier is generated. The group identifier can be associated with the graphical user interface 250 and/or the user.

Because the group identifier is associated with the user, it can be made available for use on any client computing device 110 associated with the user. As an example, group identifiers generated for various resources on a desktop computer 110 can be made available via network 140 on a mobile device 110.

Alternatively, or in addition to being associated with a user, group identifiers can be associated with the graphical user interface 250 on a client computing device 110. Thus, group identifiers generated for one client computing device 110 can differ from group identifiers generated for another client computing device 110. That is, group identifiers can be generated based on resources accessed on each particular client computing device 110.

In Step 320, based on the access relationship, the group identifier can be associated with each of the identified resources. Based on the group identifier, the identified resources can be provided for display in a group.

For example, when the graphical user interface 250 is an application and the identified resources are electronic files, the group can include a pointer (e.g., a shortcut) which points to each of the identified electronic files. For example when a user accesses a document, a spreadsheet, and a presentation within a threshold amount of time, the group can include a pointer (e.g., a shortcut) which points to the document, spreadsheet, and presentation.

It should be noted that in the preceding example, the file type of each of the electronic files was different. Thus, the document may have been accessed through a word processing application, the spreadsheet may have been accessed through a spreadsheet application, and the presentation may have been accessed through a presentation application. When the group of these three electronic files is accessed, each of the electronic files may be accessed through their respective applications.

FIG. 3B illustrates an example of a process 300B for automatically grouping websites for user access.

In Step 325, a web access history associated with a user is received e.g., by the resource grouping module 242. In one implementation, the web access history can be received by the resource grouping module 282. The web access history includes a listing of websites accessed within the web browser 250. The web access history can be generated at the client computing device 110 e.g., by the web browser 250. The web access history can also be generated at the server 170 based on, for example, DNS queries or other data requested by or received from the client computing device 110.

In Step 330, at least two websites, which are accessed within a threshold amount of time, are identified based on the received web access history. For example, when the received web access history indicates that a first website is accessed, and within a threshold amount of time, a second website is accessed, the first website and the second website can be identified.

The threshold amount of time can be configured based on a user-selectable value. For example, a user can select a value for the threshold amount of time. The threshold amount of time can also be set by default, or by the client computing device 110 or the server 170.

In Step 335, a website group graphic is generated. The website group graphic points to each of the websites identified in Step 330.

The website group graphic can be, for example, an icon, an image, a figure, and so on. The website group graphic can include or represent some or all of a graphic corresponding to each of the identified websites. To illustrate, an example of a website group graphic that points to a first website, a second website, a third website, and a fourth website can be considered. The aforementioned websites correspond to a first website graphic, a second website graphic, a third website graphic, and a fourth website graphic, respectively.

In one implementation, the website group graphic can include all four website graphics in a manner that each of the website graphics are visible in their entirety. The size of one or more of the website graphics may be reduced. For example, the first website graphic may constitute a greater portion of the website group graphic, as compared to, the portion constituted by the second, third, and fourth website graphics.

The reduction in size can be in terms of quality (e.g., resolution) of the underlying website graphic(s), the data size of the website graphic(s), or the visual size (e.g., in pixels, screen area) of the website graphic(s).

It should be noted that in other implementations, a textual pointer (e.g., a hyperlink) can be used to point to the websites identified in Step 330. That is, while implementations wherein the website pointer is a website group graphic are discussed, other types of pointers may be used to implement the subject technology.

In Step 340, the website group graphic is provided for display in the web browser 250. The web browser 250 is configured to access each of the identified websites, based on an input directed to the website group graphic. For example, when a user input 206 such as a mouse-click is received, the web browser 250 can launch the websites pointed to by the website group graphic.

The web browser 250 can also be configured to display the website group graphic based on an access frequency of the identified websites, which are pointed to by the website group graphic.

For example, a first website group graphic with one or more underlying websites that are accessed more frequently, may be displayed while a second website group graphic with underlying websites that are accessed less frequently, may not be displayed. In one implementation a certain number of website group graphics having the most frequently accessed websites may be displayed.

As another example, a first website group graphic with one or more underlying websites that are accessed more frequently, may be displayed at a more prominent display position than a second website group graphic with underlying websites that are accessed less frequently.

The access frequency can also be used with respect to the appearance of the website group graphic. For example, a first website graphic corresponding to a first website that is accessed more frequently may be displayed at a more prominent position in the website group graphic, than a second website graphic corresponding to a second website that is accessed less frequently. In one implementation, the website group graphic may include cascaded website graphics in which the front website graphic corresponds to a website that is most frequently accessed.

A user may change the display position of a website group graphic, configure the website group graphic to be always visible, or configure the website group graphic to not be visible for a certain amount of time, or permanently. For example, the user may click and drag a website group graphic from one display position to another. The user may also select an option (e.g., enabling a "star," by "pinning") that would make the website group graphic persistently appear, or persistently appear at a certain display position. The user may also select an option to dismiss (e.g., by deleting, closing) temporarily, or persistently, the website group graphic.

FIG. 3C illustrates another example of a process 300C for automatically grouping websites for user access.

Step 345 is similar to Step 325 in that a web access history associated with the user is received, e.g., by a resource grouping module (e.g., 242, 282).

In Step 350, at least two websites, which are accessed within a threshold amount of time, and are accessed at an access frequency, are identified based on the received web access history. Step 350 is similar to step 330 in that at least two websites are identified based on whether they are accessed within a threshold amount of time. However, in step 350, the access frequency of one or more of the identified websites is also considered.

Step 355 is similar to Step 335 in that a website group graphic, which pointes to each of the identified websites, is generated. Similar to Step 335 in other implementations, a textual pointer (e.g., a hyperlink) can be used to point to the websites identified in Step 350. That is, while implementations wherein the website pointer is a website group graphic are discussed, other types of pointers may be used to implement the subject technology.

In Step 360, the website group graphic is provided for display in the web browser 250. The web browser 250 is configured to access each of the identified websites, based on an input directed to the website group graphic. The web browser 250 is further configured to display the website group graphic at a display position commensurate with the access frequency of the underlying websites.

Figure 4A:
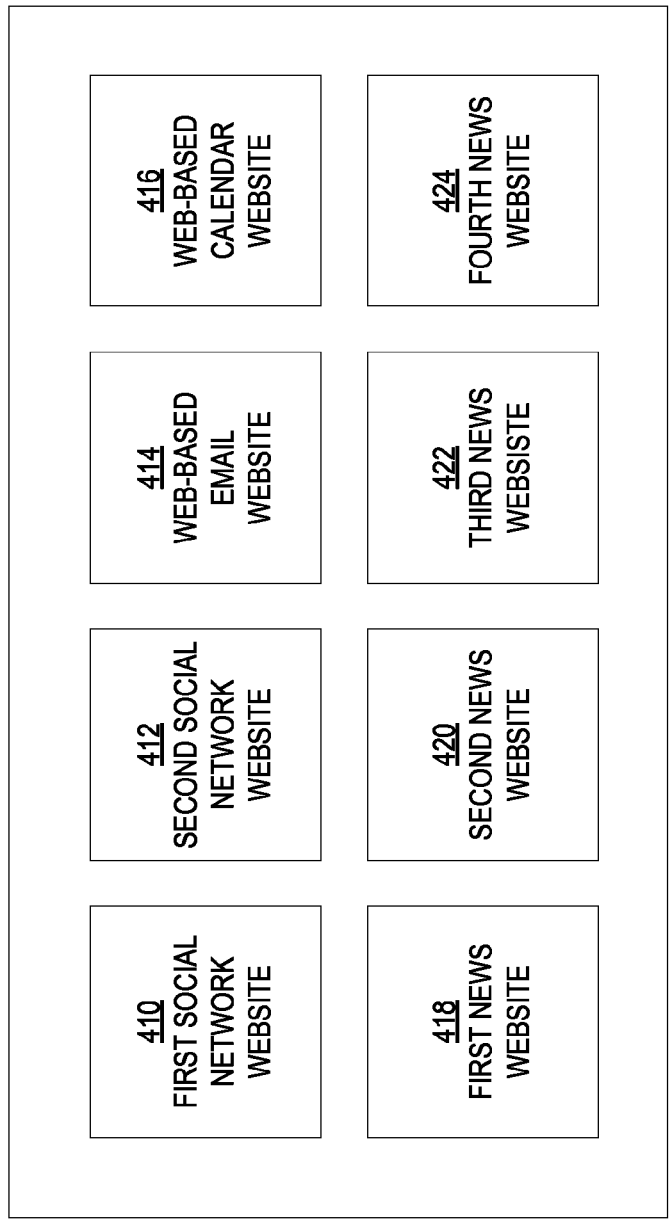
Figure 4C:
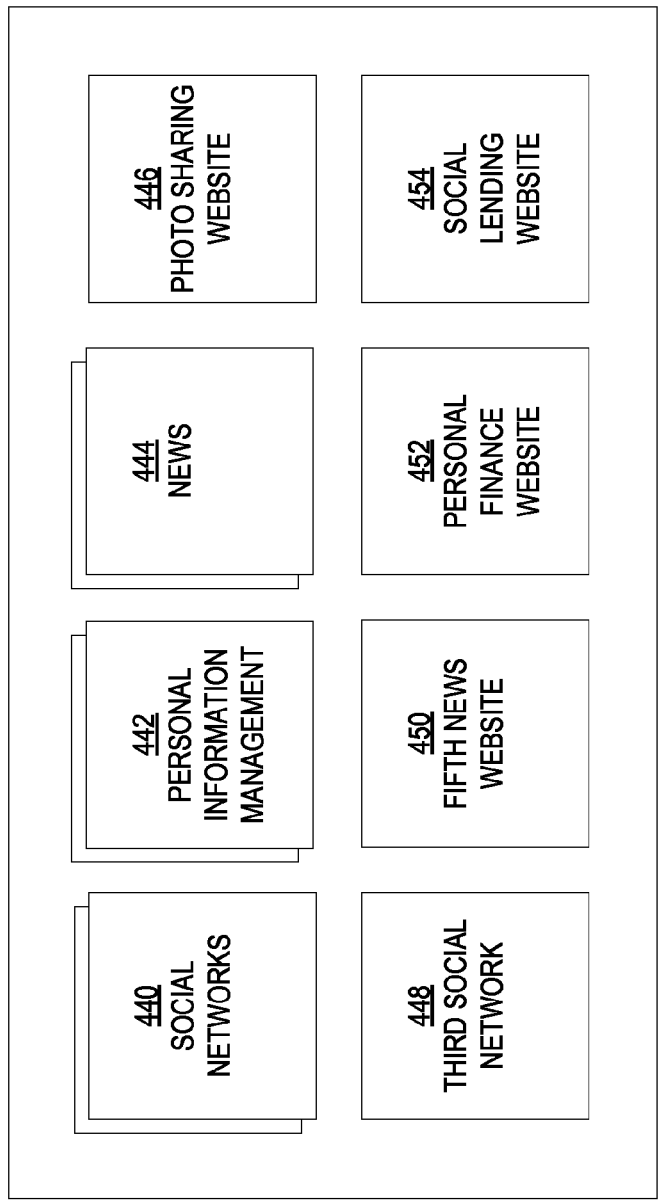

FIGS. 4A-C display examples of some configurations in which website group graphics can be arranged for display in a web browser based on the preceding examples of processes 300A-C.

FIG. 4A illustrates eight graphics 410-424 that correspond, respectively, to eight websites. The first graphic 410 corresponds to a first social network website. The second graphic 412 corresponds to second social network website. The third graphic 414 corresponds to a web-based email website. The fourth graphic 416 corresponds to a web-based calendar website. The fifth graphic 418 corresponds to a first news website. The sixth graphic 420 corresponds to a second news website. The seventh graphic 422 corresponds to a third news website that focuses on technology startup companies. The eighth graphic 424 corresponds to a fourth news website that focuses on the latest electronic gadgets.

FIG. 4B illustrates an example of how the above-described processes 300A-C can be used to display the graphics 410-424.

In this example, the user's web access history indicates that the user accesses the first social network website and the second social network websites in succession. That is, on several occasions, when the user accesses the first social network website, the user also accesses (e.g., in a second tab or window) the second social network website. Similarly, the user's web access history indicates that the user accesses the web-based e-mail website, and the web-based calendar website in succession. And, the user's web access history indicates that the user accesses the first news website, the second news website, the third news website, and a fourth news website in succession.

Based on the user's web access history, three website group graphics 430-434 are generated. With respect to process 300A, group identifiers can be associated with each of the websites represented by the graphics 410-424. The websites represented by the graphics 410-424 can then be grouped using the group identifiers. With respect to processes 300B or 300C, the website group graphics 430-434 can be generated based on, in this example, the amount of time elapsed between the times when the websites are accessed. That is, when websites are accessed in "groups," a group identifier can be used to group them. With respect to process 300C, the number of times the various websites represented by the graphics 410-424 are accessed, can also be considered. That is, website group graphics can be either displayed, or not displayed based on the frequency with which the underlying websites of the website group graphics are accessed. And, similarly, the display position of the website group graphics can be automatically selected based on this access frequency.

In FIG. 4B, website group graphic 430 is generated based on the graphics 410-412 which correspond to the social network websites, which are identified as being accessed in groups. Similarly, website group graphic 432 is generated based on the graphics 414-416 which correspond to the email and calendar websites, which are identified as being accessed in groups. And, website group graphic 434 is generated based on the graphics 418-424 which correspond to the news websites, which are identified as being accessed in groups.

It should be noted that the visual sizes of the website group graphics 430-434 are not identical. Website group graphics 430 and 432 are smaller in size as compared to website group graphic 434. The visual sizes in this example differ because the underlying graphics 410-424 are not manipulated, e.g., altered in size. However, the size of the website group graphics 430-434 can be tied to other information. For example, the size of the website group graphics 430-434 can be tied to the frequencies with which their underlying websites are accessed. As another example, the size of the website group graphics can be tied based on the amount of time that is spent on one group of websites as compared to another group of websites.

FIG. 4C illustrates another example of how the above-described processes 300A-C can be used to display the graphics 410-424.

In this example, the website group graphics 440-444 are generated to have an appearance different than website group graphics 430-434. In this example, the underlying graphics 410-424 are manipulated to give the website group graphics 440-444 a cascaded appearance. As illustrated in FIG. 4C, website group graphic 440 is generated based on the graphics 410-412 which correspond to the social network websites, which are identified as being accessed in groups. Similarly, website group graphic 442 is generated based on the graphics 414-416 which correspond to the email and calendar websites, which are identified as being accessed in groups. And, website group graphic 444 is generated based on the graphics 418-424 which correspond to the news websites, which are identified as being accessed in groups.

The front of the cascaded appearance of the website group graphics 444-446 can be based on the graphic corresponding to the website that is most frequently accessed among the websites of that group. As another approach, the website visited for the longest duration can be displayed at the front of the cascaded appearance of the website group graphics.

The names of the underlying websites can also be listed on the front of the website group graphics 440-444. For example, the name of the first social network website and the name of the second social network website can be displayed (e.g., as a list) on the front of the website group graphic 440. Similarly, the names of the underlying websites can be listed on the front of the website group graphics 442 and 444.

In one implementation, where a logical relationship exists between the underlying websites, terms descriptive of the relationship can be displayed. For example, the first social network website and the second social network website can be related in that they are both social networks. Thus, the term "Social Networks" can be used in addition to, or as a substitute for the listing on the front of the website group graphic 440. The term (e.g., "Social Networks") can be selected based on a matching of descriptors associated with each of the websites. The descriptors can be within the web browser 250 (e.g., a folder description, a tag) or retrieved from the memory 280 of the server 170.

Similarly, terms such as for example, "Personal Information Management," "Email & Calendar," or "Communication & Scheduling" can be selected for display on the front of website group graphic 442. And, terms such as for example "News," "Current Affairs," or "What's New?" can be selected for display on the front of website group graphic 444.

In FIG. 4C, website group graphic 440 is displayed with the term "Social Networks," website group graphic 442 is displayed with the term "Personal Information Management," and website group graphic 444 is displayed with the term "News." In this example, the underlying websites are not listed as they were in FIG. 4B.

The display positions of the website group graphics 440-444 can be based on the frequency with which the websites of a particular group are accessed. In this example, the user accesses the social network websites more often than the email and calendar websites, and the news websites. Thus, the website group graphic 440 is displayed on the top left of the arrangement. Website group graphics 442 and 444 are displayed in a decreasing order of access frequency.

Because the website group graphics 440-442 occupy a smaller display area within the web browser 250, the additional space can be used by graphics 446-454 which correspond to other websites. The graphics 446-454 can be selected in a manner similar to that described above. For example, the graphics 446-454, can correspond to websites that are accessed at various frequencies.

In this example, the graphics 446-454 are not displayed as website group graphics because, based on the web access history of the user, the websites corresponding to the graphics 446-454 are not accessed in groups.

Graphic 446 corresponds to a photo sharing website. Graphic 448 corresponds to a third social network. Graphic 450 corresponds to a fifth news website. Graphic 452 corresponds to a personal finance website. Graphic 454 corresponds to a social lending website, which is also a financial website.

It should be noted that in this implementation, the third social network is not grouped with the social networks referenced by website group graphic 440. Similarly, the fifth news website is not grouped with the news websites referenced by website group graphic 444. And, the personal finance website and the social lending website are also not grouped into a website group graphic. This is because in this implementation, the grouping is based on whether the websites are accessed in groups. However, a user may add (e.g., by dragging and dropping) the third social network to website group graphic 440, or any other website group graphic for that matter.

It should be noted that FIGS. 4A-4C are described with respect to a user. However, as explained earlier in this document, group identifiers or website group graphics can be associated with a particular client computing device 110 as an alternative to, or in addition to the user. Thus, the group identifiers or website group graphics displayed in FIGS. 4B and 4C can be different than other group identifiers or website group graphics generated for the user on a different client computing device 110.

Thus, as an example, the user can have on a desktop computer 110, a first set of website group graphics that correspond to websites most frequently accessed on that desktop computer, and have on a smartphone 110, a second set of website group graphics that correspond to websites most frequently accessed on that smartphone.

With respect to group identifiers described earlier, for example, with reference to process 300A, various resources accessed on a particular client computing device 110 can also be grouped. As an example, a user who often launches one set of electronic files, applications, websites, and the like on a desktop computer 110 can have a set of group pointers that can be used to access that set of documents, applications, and websites on that desktop computer 110. And, the same user can have on a smartphone 110, a different set of group pointers that can be used to access a different set of resources, such as websites, applications, and electronic files.

Although certain examples provided herein describe a user's information (e.g., resource access history, web access history) being stored in memory (e.g., 240, 280), the collection, use, and deletion of such information may be user-selectable or user-configurable. For example, the user may delete the user information from memory and/or disable having the user information stored in memory. In example aspects, the user can adjust appropriate privacy settings to selectively limit the types of user information stored in memory, or select the memory in which the user information is stored (e.g., locally on the user's device as opposed to remotely a server). In example aspects, the user information does not include and/or share the specific identification of the user (e.g., the user's name) unless otherwise specifically provided or directed by the user.

Figure 5:
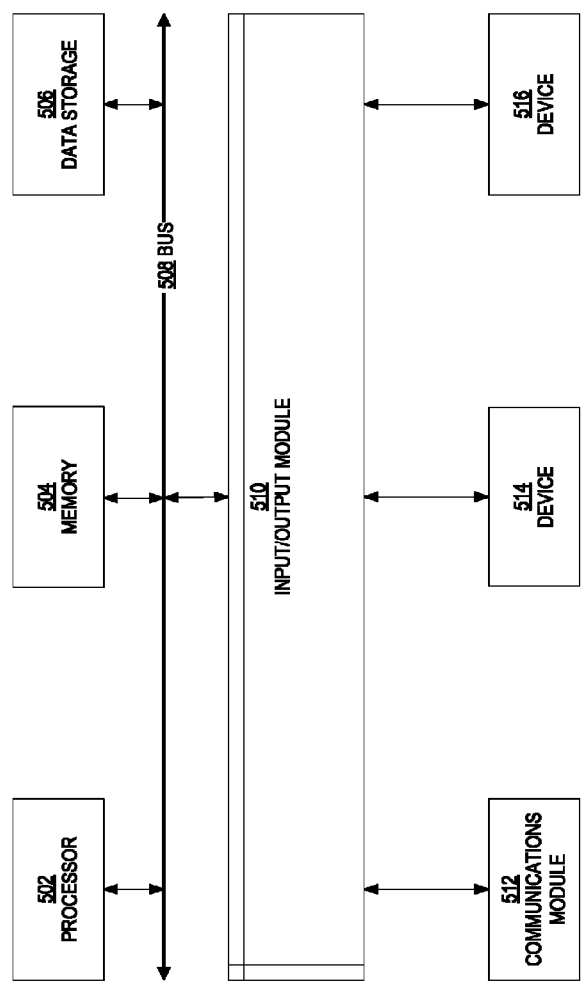
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client computing device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client computing device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, with languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk, optical disk, or solid state disk coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client computing device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include client computing devices and servers. A client computing device and server are generally remote from each other and typically interact through a communication network. The relationship of client computing device and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for automatically associating resources with a group identifier, the method comprising:

receiving a resource access history associated with a user, wherein the resource access history comprises a listing of a plurality of resources previously accessed by the user within a graphical user interface;

identifying, based on the received resource access history, at least two of the plurality of resources, wherein the at least two of the plurality of resources are related based on an access relationship, wherein the access relationship is based on an access-related aspect of the received access resource history corresponding to each of the at least two of the plurality of resources, and wherein the access-related aspect of the access relationship is based on a second resource of the at least two resources being accessed within a threshold amount of time after a first resource of the at least two resources;

generating a group identifier, wherein the group identifier is associated with at least one of the graphical user interface or the user; and associating, based on the access relationship, the group identifier with each of the at least two of the plurality of resources.

2. The computer-implemented method of claim 1, wherein the threshold amount of time is configured based on a user-selectable value.

3. The computer-implemented method of claim 1, further comprising:

providing for display in a group, at least two graphical pointers, wherein each of the at least two graphical pointers respectively correspond to each of the at least two of the plurality of resources, and wherein the group is based on the group identifier.

4. The computer-implemented method of claim 1, wherein the access-related aspect of the access relationship is further based on accessing of the second resource based on an input directed to the first resource.

5. The computer-implemented method of claim 4, wherein the first resource is a parent window of the graphical user interface, and wherein the second resource is a child window of the graphical user interface.

6. The computer-implemented method of claim 1, wherein the graphical user interface corresponds to an application, and wherein the at least two of the plurality of resources comprise at least two electronic files corresponding to the application.

7. The computer-implemented method of claim 1, wherein the graphical user interface corresponds to an operating system.

8. The computer-implemented method of claim 7, wherein the at least two of the plurality of resources comprise at least two applications installed on the operating system.

9. The computer-implemented method of claim 7, wherein the at least two of the plurality of resources comprise a first electronic file corresponding to a first application, and a second electronic file corresponding to a second application.

10. The computer-implemented method of claim 6, wherein the at least two of the plurality of resources comprise a first electronic file corresponding to a first application, and a second application.

11. The computer-implemented method of claim 1, wherein the graphical user interface corresponds to a web browser, and wherein the at least two of the plurality of resources comprise at least two websites.

12. The computer-implemented method of claim 1, wherein the group identifier is based on an access-related aspect of the relationship each of the at least two of the plurality of resources.

13. A system for automatically grouping websites for user access, the system comprising:

a memory comprising instructions for automatically grouping websites for user access; and a processor configured to execute the instructions to:

receive a web access history associated with a user, wherein the web access history comprises a listing of a plurality of websites previously accessed by the user within a web browser;

identify, based on the received web access history, at least two of the plurality of websites, wherein a second website of the at least two of the plurality of websites is being accessed within a threshold amount of time after a first website of the at least two of the plurality of websites;

generate a website group graphic, wherein the website group graphic points to each of the at least two of the plurality of websites; and provide for display in the web browser, the website group graphic, wherein the web browser is configured to access each of the at least two of the plurality of websites, based on an input directed to the website group graphic.

14. The system of claim 13, wherein the website group graphic comprises at least a portion of a graphic corresponding to one or more of the at least two of the plurality of websites.

15. The system of claim 13, wherein the web browser is configured to display the website group graphic based on an access frequency of the at least two of the plurality of websites.

16. The system of claim 13, wherein the web browser is configured to display the website group graphic at a display position within the web browser, based on an access frequency of the at least two of the plurality of websites.

17. The system of claim 13, wherein the web browser is configured to display the website group graphic at a display position, within the web browser, based on an input.

18. A non-transitory machine-readable storage medium comprising machine-readable instructions for causing a processor to execute a method for automatically displaying frequently accessed websites in website groups, the method comprising:

receiving a web access history associated with a user, wherein the web access history comprises a listing of a plurality of websites previously accessed by the user within a web browser;

identifying, based on the received web access history, at least two of the plurality of websites, wherein a second website of the at least two of the plurality of websites is being accessed within a threshold amount of time after a first website of the at least two of the plurality of websites;

generating a website group graphic, wherein the website group graphic points to each of the at least two of the plurality of websites; and providing for display in the web browser, the website group graphic, wherein the web browser is configured to display the website group graphic at a display position commensurate with the access frequency of the at least two of the plurality of websites, and wherein the web browser is configured to access each of the at least two of the plurality of websites based on an input directed to the website group graphic.

19. The non-transitory machine-readable storage medium of claim 18, wherein the website group graphic comprises a graphical representation of at least a portion of one or more of the at least two of the plurality of websites.

* * * * *